(12) United States Patent
Koskinen et al.

(10) Patent No.: US 9,426,356 B2
(45) Date of Patent: Aug. 23, 2016

(54) METHOD, APPARATUS AND COMPUTER PROGRAM FOR SELECTING IMAGES

(71) Applicant: Nokia Technologies Oy, Espoo (FI)

(72) Inventors: Annina Koskinen, Espoo (FI); Michiel Terlouw, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 65 days.

(21) Appl. No.: 13/788,483

(22) Filed: Mar. 7, 2013

(65) Prior Publication Data

US 2014/0253791 A1 Sep. 11, 2014

(51) Int. Cl.
*H04N 5/232* (2006.01)
*H04N 1/21* (2006.01)
*G06F 17/30* (2006.01)

(52) U.S. Cl.
CPC ...... *H04N 5/23222* (2013.01); *G06F 17/30265* (2013.01); *H04N 1/212* (2013.01); *H04N 5/232* (2013.01); *H04N 2201/0084* (2013.01)

(58) Field of Classification Search
CPC ............... H04N 1/212; H04N 1/2129–1/2133; H04N 5/23222
USPC .......................................... 348/231.3, 231.6
See application file for complete search history.

(56) References Cited

U.S. PATENT DOCUMENTS

| 2009/0052783 | A1 | 2/2009 | Aoki et al. |
| 2009/0324098 | A1* | 12/2009 | Nilsson ......................... 382/209 |
| 2011/0044549 | A1* | 2/2011 | Bressan ........................ 382/225 |
| 2011/0164147 | A1* | 7/2011 | Takahashi et al. ....... 348/231.99 |
| 2012/0013737 | A1* | 1/2012 | Umeyama et al. ............ 348/135 |
| 2012/0213445 | A1 | 8/2012 | Luu et al. |
| 2012/0306999 | A1* | 12/2012 | Zhou .................... H04N 5/2624 348/36 |
| 2013/0162864 | A1 | 6/2013 | Wang et al. |
| 2013/0176442 | A1* | 7/2013 | Shuster et al. ............. 348/207.1 |

FOREIGN PATENT DOCUMENTS

JP 2003 348519 A 12/2003

OTHER PUBLICATIONS

"The World's First Motion Snapshot;" Nikon; retrieved on Apr. 8, 2013 from <http://nikon1.nikon-asia.com/innovation.php#i 1>.
European Search Report for Application No. EP 14 15 6834 dated Jun. 3, 2014.

* cited by examiner

*Primary Examiner* — Paul Berardesca
(74) *Attorney, Agent, or Firm* — Alston & Bird LLP

(57) ABSTRACT

The present disclosure relates to method, apparatus and computer program selecting captured images. According to an example, a method comprises causing, at least in part, actions that result in: capturing an image; associating the captured image with at least one parameter; capturing a reference image; associating the captured reference image with at least one reference parameter; and determining to select the captured image based on a comparison of its associated at least one parameter against the at least one reference parameter.

18 Claims, 5 Drawing Sheets

METHOD, APPARATUS AND COMPUTER PROGRAM FOR SELECTING IMAGES

TECHNOLOGICAL FIELD

Embodiments of the present invention relate to a method, apparatus and computer program for selecting images. In particular, though without prejudice to the foregoing, embodiments relate to a method, apparatus and computer program for capturing and selecting images related to a captured reference image.

BACKGROUND

Image capturing devices are known which, when a user takes a photo of a particular scene, also additionally capture and store supplementary photos or even video footage. Such previous devices are not always optimal and can either require specific user intervention to operate and/or lead to the storage of numerous photos or footage of video that do not relate to or match the scene the user intended to capture. The storage of such irrelevant photos/portions of video increases memory storage requirements for the device. Also the capture and storage of such irrelevant photos/portions of video can overwhelm a user when subsequently viewing, sorting, managing and deleting the superfluous photos/videos. Such issues have previously been sought to be addressed by either setting a predetermined limit on the number of additional photos taken or setting a predetermined time limit of the duration of video recorded. Other previous devices required an explicit user decisions/direct user intervention to capture additional photos, e.g. only taking additional photos whilst the user maintains actuation of a shutter button.

The listing or discussion of any prior-published document or any background in this specification should not necessarily be taken as an acknowledgement that the document or background is part of the state of the art or is common general knowledge. One or more examples of the present disclosure may or may not help to address one or more of the background issues.

BRIEF SUMMARY

Various aspects of examples of the invention are set out in the claims.

According to at least some examples of the invention there is provided a method comprising causing, at least in part, actions that result in: capturing at least one image; associating the captured at least one image with at least one parameter; capturing a reference image; associating the captured reference image with at least one reference parameter; and determining to select the captured at least one image based on a comparison of its associated at least one parameter against the at least one reference parameter.

According to at least some examples of the invention there is provided an apparatus comprising means configured to cause the apparatus to perform at least the above method.

According to at least some examples of the invention there is provided an apparatus comprising: at least one processor; and at least one memory including computer program code; the at least one memory and the computer program code configured to, with the at least one processor, cause the apparatus at least to perform: capturing at least one image; associating the captured at least one image with at least one parameter; capturing a reference image; associating the captured reference image with at least one reference parameter; and determining to select the captured at least one image based on a comparison of its associated at least one parameter against the at least one reference parameter.

According to at least some examples of the invention there is provided a non-transitory computer readable medium encoded with instructions that, when performed by at least one processor, causes at least the following to be performed: capturing at least one image; associating the captured at least one image with at least one parameter; capturing a reference image; associating the captured reference image with at least one reference parameter; and determining to select the captured at least one image based on a comparison of its associated at least one parameter against the at least one reference parameter.

According to at least some examples of the invention there is provided a computer program comprising instructions that, when executed by at least one processor, cause at least the above method to be performed.

BRIEF DESCRIPTION

For a better understanding of various examples that are useful for understanding embodiments of the invention, reference will now be made by way of example only to the accompanying drawings in which.

Figure 2:
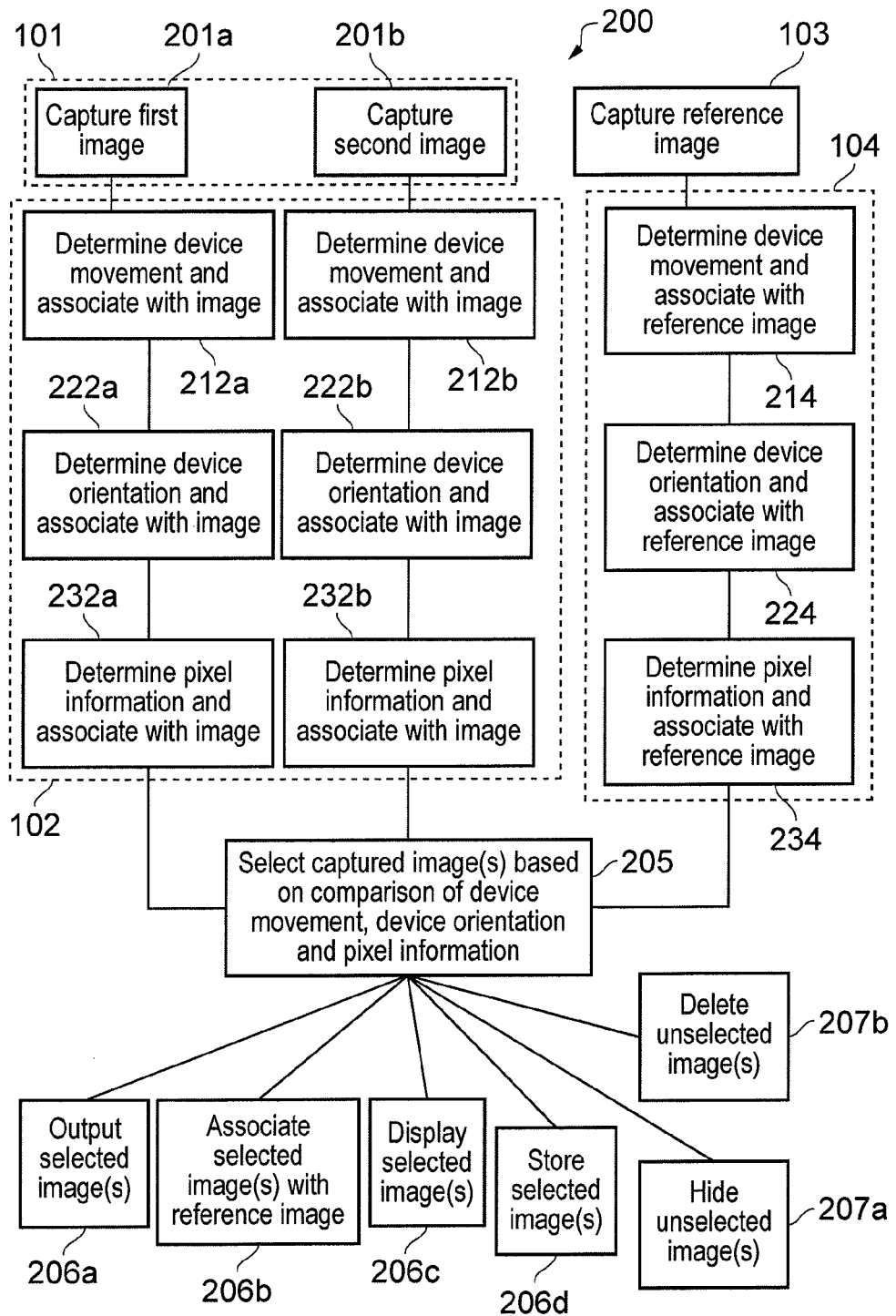
FIG. 2 illustrates a flowchart of a further example.
Figure 3:
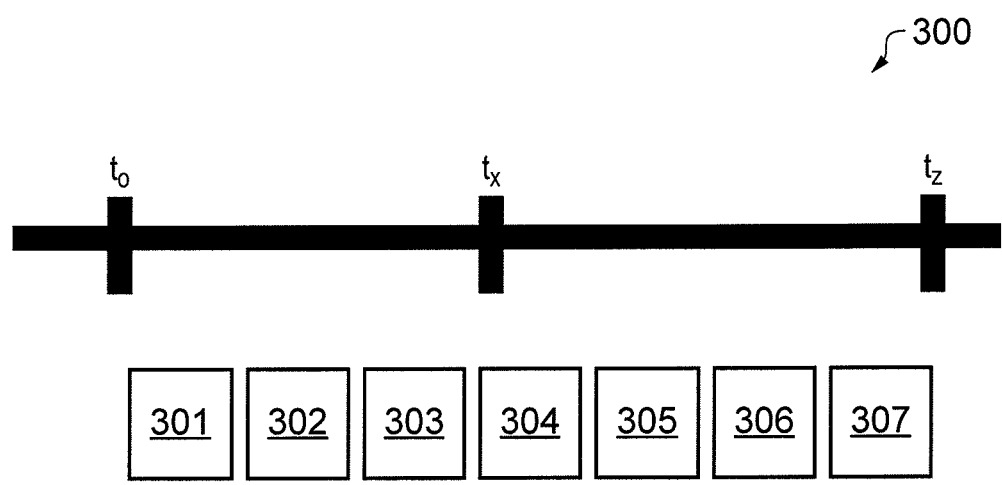
Figure 4:
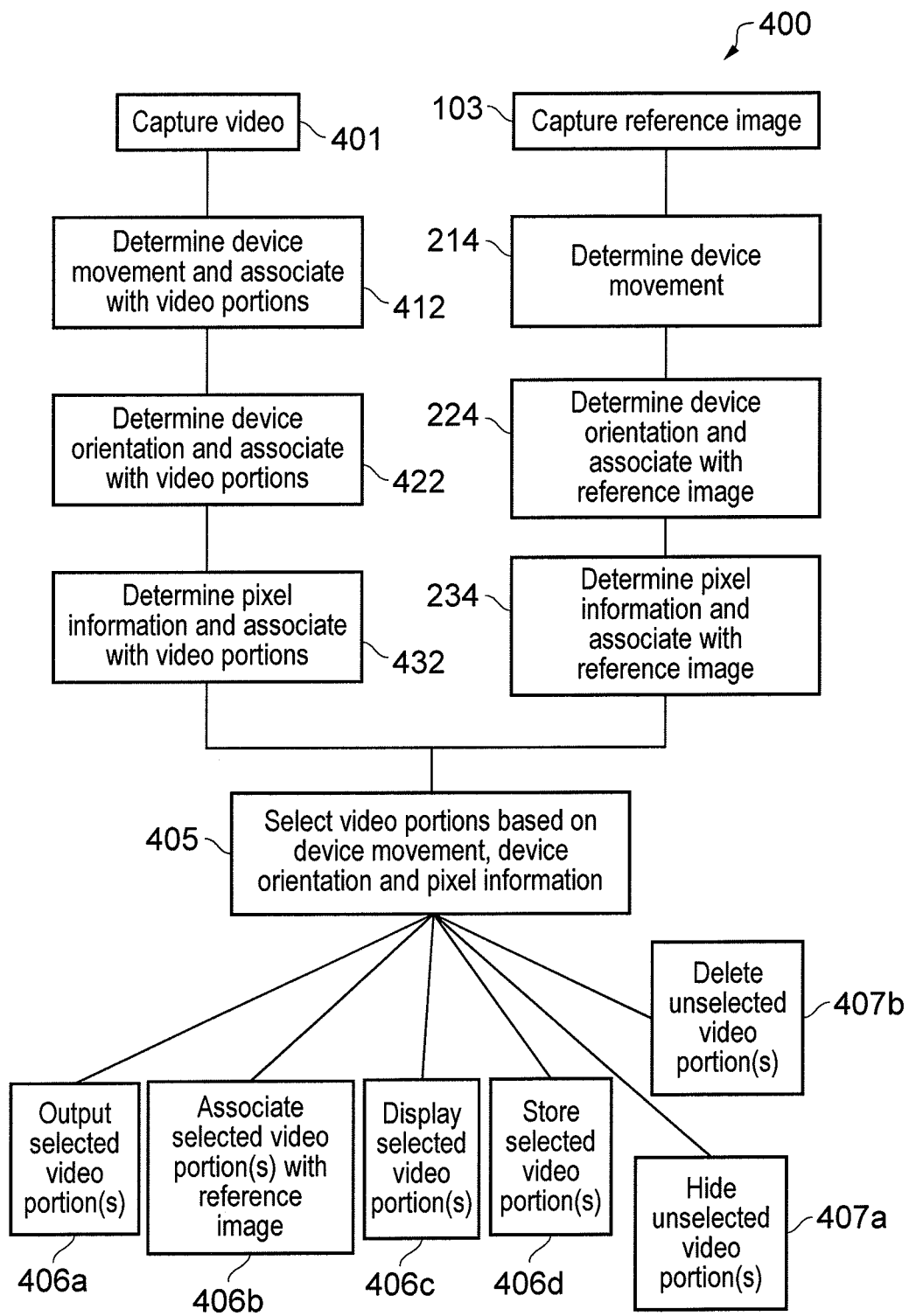
Figure 5:
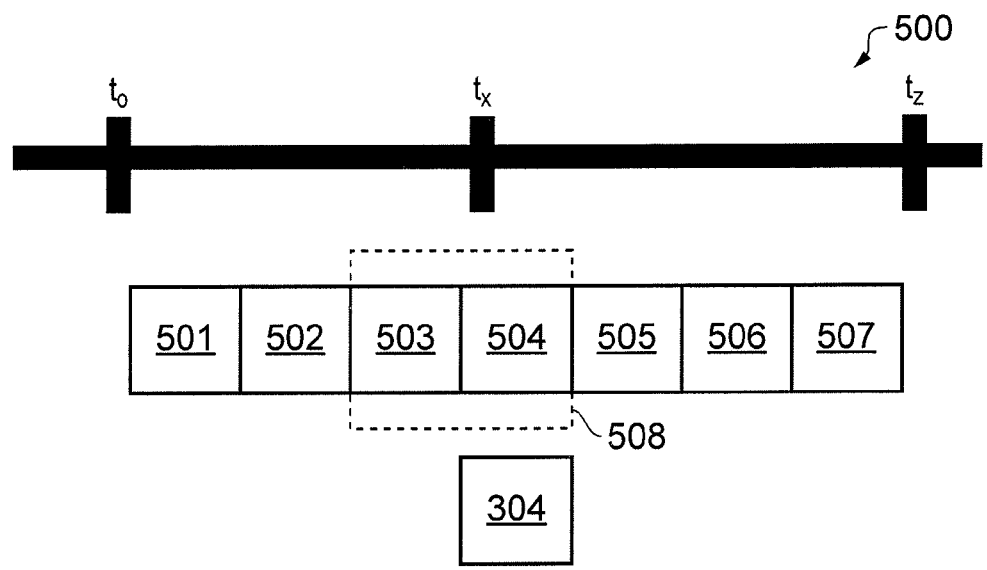
Figure 6:
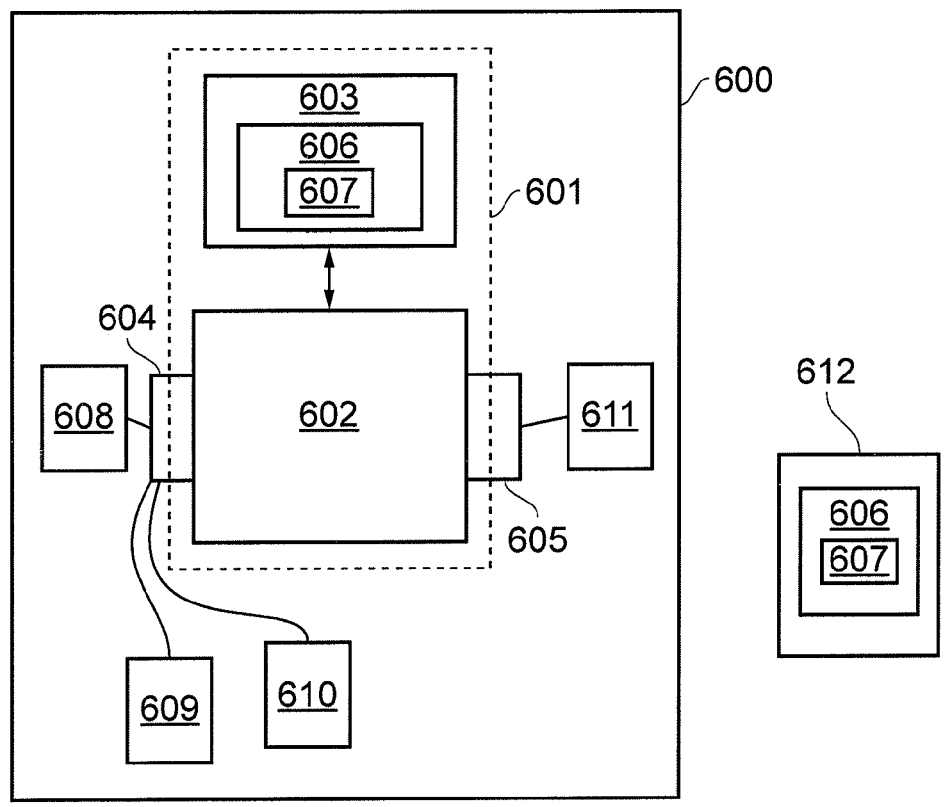

FIG. 3 schematically illustrates a timeline of operation of the example of FIG. 2;

FIG. 4 illustrates a flowchart of a yet further example;

FIG. 5 schematically illustrates a timeline of operation of the example of FIG. 4;

FIG. 6 schematically illustrates an apparatus and computer program of a yet further example.

DETAILED DESCRIPTION

The Figures schematically illustrate a method (100) comprising causing, at least in part, actions that result in: capturing at least one image (101); associating the captured at least one image with at least one parameter (102); capturing a reference image (103); associating the captured reference image with at least one reference parameter (104); and determining to select the captured at least one image based on a comparison of its associated at least one parameter against the at least one reference parameter (105).

Certain non-limiting examples enable, in addition to the user directed capturing of a primary reference image, automatic capturing of further one or more images in the background. However, the further captured images are only selected, e.g. for subsequent use, based on a comparison a parameter associated with the image against an equivalent parameter of the reference image. Advantageously, various examples enable the selection (e.g. for storage or subsequent processing/display) of captured images that are relevant to the captured reference image i.e. the object, scene or event that is desired to be imaged. Thus certain non-limiting examples provide clustering or grouping of captured images related to an event and enable irrelevant captured images to be filtered out without requiring user intervention.

In some examples, the parameter which is associated with the captured image(s) and the captured reference image may be calculated based on a property which is intrinsic to the captured image, e.g. related to pixel values of captured image. Alternatively, the parameter associated with the captured image and reference image may related to an attribute that is extrinsic to the images, e.g. an attribute that is based on the device which captured the images, such as an orientation or degree of movement of the device at the time the image and the reference image were captured.

The capturing of an image may correspond to: capturing a plurality of images, capturing plurality of frames of a video or recording an audio/visual video. In some examples, the capturing of the plurality of images is automated, in that the capturing of each image of the sequence of captured images occurs without requiring specific direct user intervention/actuation for each capture, e.g. a user need not press or hold down a shutter release button for each of the plurality of captured images.

The capturing of the plurality of images may commence in response to at least one of: activating an image capture mode of a device; detecting powering up of a device; and receiving a user input for capturing the reference image. The capturing of the plurality of images may terminate in response to at least one of: deactivating an image capture mode of a device; detecting powering down of a device; and receiving a user input for capturing the reference image.

Various examples of the present disclosure will now be described with reference to the Figures. Similar reference numerals are used in the Figures to designate similar features. For clarity, all reference numerals are not necessarily displayed in all figures.

Examples of the invention may take the form of a method, an apparatus or a computer program. Examples may be implemented in hardware, software or a combination of hardware and software.

Examples of the invention are described using flowchart illustrations and schematic block diagrams. It will be understood that each block (of the flowchart illustrations and block diagrams), and combinations of blocks, can be implemented by computer program instructions, such as a subroutine, of a computer program. These program instructions may be provided to one or more controllers or processors such that the instructions which execute on the processor(s) create means for implementing the functions specified in the block or blocks. The computer program instructions may be executed by the processor(s) to cause a series of operational steps to be performed by the processor(s) to produce a computer implemented process such that the instructions which execute on the processor(s) provide steps for implementing the functions specified in the block or blocks.

Accordingly, the blocks support: combinations of means for performing the specified functions; combinations of steps for performing the specified functions; and computer program instructions for performing the specified functions. It will also be understood that each block, and combinations of blocks, can be implemented by special purpose hardware-based systems which perform the specified functions or steps, or combinations of special purpose hardware and computer program instructions.

Figure 1:
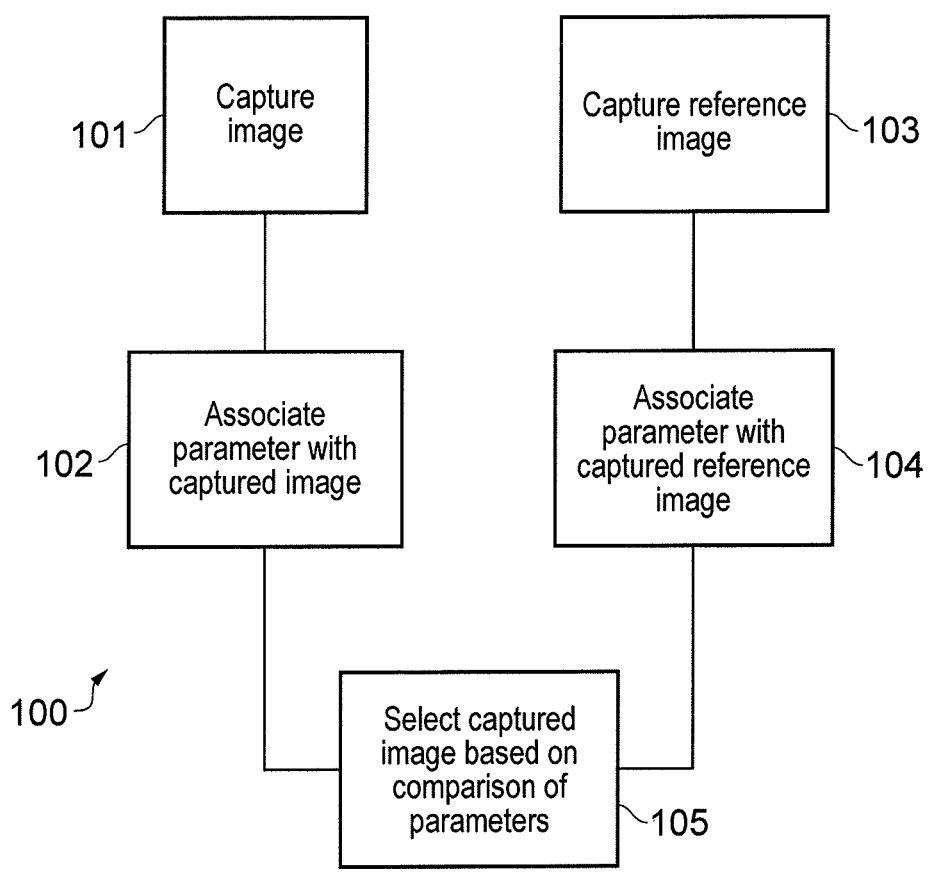
FIG. 1 illustrates a flowchart of an example.

FIG. 1 schematically illustrates a flow chart 100 of an example of the present disclosure. In block 101, at least one image is captured. In block 102, at least one parameter is associated with the captured image. The parameter may relate to an intrinsic property of the captured image, e.g. at least one of: relating to its content, pixel values, and colour distribution. Alternatively, the parameter may relate to an attribute extrinsic of the captured image, such as a property of a device which captured the image e.g. as relating to the device's orientation or movement at the time the image was captured. Prior to block 102, a determination may be made to determine the parameter (not shown), e.g. analysing the captured image to determine an intrinsic property or receiving an extrinsic attribute, for association with the captured image.

In block 103, a reference image is captured. It is to be appreciated that block 103 could be performed after, before or simultaneously with block 101. In block 104, at least one reference parameter, equivalent to the type of parameter of block 102, is associated with the captured reference image.

The capturing of the reference image in block 103 may be in direct response to a user input to take a photo, such as user actuation of a shutter release mechanism, selecting a button/key/icon to take a photo. The capturing of the at least one image in block 101 need not be in direct response to a specific user input to capture an image, but could automatically take place in response to detection of a triggering event, such as powering up of a device or activation of an image capturing mode of the device.

In block 105, a determination is made whether or not to select the captured image based on a comparison between the at least one parameter of the captured image and the at least one reference parameter of the captured reference image. For example, a difference between values of the parameters could be determined and the image could be selected were it to have a difference in parameter values less than a threshold amount.

Accordingly, this example could be used to select captured images that are similar to a reference image, i.e. to filter out images that are dissimilar. However, in an alternative example, the selection of a captured image could be based on its dissimilarity to a reference image, i.e. to filter out images that are similar to a reference image.

FIG. 2 schematically illustrates another flow chart 200 of a further example of the present disclosure. In this example the capturing of an image of block 101 of FIG. 1 comprises capturing a plurality of images. Also, the association of a parameter of blocks 102 and 104 of FIG. 1 comprises determining and associating a plurality of parameters.

The flowchart of FIG. 2 represents one possible scenario among others. The order of the blocks shown is not absolutely required, so in principle, the various blocks can be performed out of order. Not all the blocks are essential. In certain embodiments one or more steps may be performed in a different order or overlapping in time, in series or in parallel one or more steps may be omitted or added or changed in some combination of ways.

In blocks 201a, 201b and 103; a first image, a second image and a reference image is captured respectively.

In block 212a information relating to movement of an imaging device is determined. Information relating to a degree of movement of the imaging device, when capturing the first image, may be derived, e.g. from an accelerometer or other movement sensor of the device. The determined movement information is associated with the first image.

In block 222a information relating an orientation of the imaging device, when capturing the first image, is determined. This may be derived, e.g. from a gyroscope, magnetic compass or other sensor for sensing an orientation of the device. The determined orientation information is associated with the first image. The orientation information may relate to at least one of: yaw, pitch and roll angles of the device, an angular bearing of the device, vertical/horizontal alignment of the device and landscape/portrait alignment of the device.

In block 232a image analysis of the first image is performed to determine pixel information of the first image. The determined pixel information is associated with the first image. For example an artefact of the image could be calculated that would provide a 'fingerprint' of the image, e.g. colour distribution such as percentages of one or more colours of pixels—red, green, blue, black, white . . . . The image analysis could involve an algorithm that determines a degree of similarity of the captured image to the captured reference image, such that only captured images that match or are sufficiently similar to the captured reference image are selected (or in an alternative example, only selecting captured images sufficiently dissimilar to the captured reference image).

In blocks 212b, 222b and 232b, equivalent processes to those of blocks 212a, 222a and 232a are performed with respect to the second image. Likewise, in blocks 214, 224 and 234, equivalent processes to those of blocks 212a, 222a and 232a are performed with respect to the reference image.

In block 205, a determination is made to select one or more of the plurality of captured images based on at least one of:
   movement information,
   orientation information, and
   pixel information.

Each of the above parameters, or a combination of them, can be used to filter out captured images that are dissimilar in some way, or irrelevant to the reference image of the intended target (i.e. event, object or scene desired to be captured). For example, an image could be considered similar to a reference image based on considering each of the parameters individually. However, a comparison algorithm could calculate an overall score based on the above three parameter (e.g. by adding or multiplying them together, duly weighted if necessary). If that score crosses a pre-defined threshold, the conclusion could be that the image is not similar (enough) to the reference image and thus not selected.

It is to be appreciated that the order of the block 212a, 222a and 232a may vary (likewise for the ordering of blocks 212b, 222b and 232b for the second image and blocks 214, 224 and 234 for the reference image). Furthermore, it is to be appreciated that not all of the blocks are essential, for example one or more of the blocks 212a, 222a and 233a may be omitted (likewise for blocks 212b, 222b and 232b for the second image and blocks 214, 224 and 234 for the reference image). Also the ordering of the performance of the blocks may vary, e.g. the capturing of the reference image block 103 may be performed before, during or after the capturing of the plurality of images blocks 201a and 201b. Furthermore, a determination of the selection could be carried out after each of blocks parameter had been determined and associated, such that a sequential filtering of the images occurs. Advantageously, this means that, for example, the determining of pixel information need not be carried out on all of the plurality of captured images, but only a sub set of captured images that have passed the selections based on movement and orientation.

Following the determination of which captured images to select of block 205, the selected captured images may be, at least one of:
   outputted, e.g. from the device, as indicated in block 206a,
   associated with the reference image, e.g. an identifier of link is made between the selected image and the reference image, as indicated in block 206b,
   displayed, e.g. on a display of the device, as indicated in block 206c, and
   stored, e.g. on a memory storage of the device, as indicated in block 206d.

The selected captured images may be grouped together or provided with an identifier to associate each selected captured image with the captured image or the other selected captured images.

The unselected captured images may be caused to be, at least one of:
   precluded from display, e.g. hidden from view on a user interface of the device, as indicated in block 207a, and
   deleted, e.g. from a storage (temporary or otherwise) of the device thereby reducing the number of captured images that are stored, as indicated in block 207b.

FIG. 3 schematically illustrates a timeline 300 of operation of an example of FIG. 2, wherein a plurality of images 301-307 is captured along with a reference image 304 by an image capturing device. At a time $t_0$ the capturing of a sequence of images 301-307 begins, i.e. the periodic capturing of an image, e.g. n images per second such as in a burst photo capture mode. At a time $t_x$ the reference image 304 is captured. The reference image may be captured in direct response to a user input, e.g. a user input for taking a photo such as actuation of a shutter release button or similar function to cause a photo to be taken.

The triggering of the commencement of the capture of the plurality of images at $t_0$ may be in response to determining at least one of:
   activation of an image capture mode of a device;
   detection of powering up of a device; and
   receipt of a user input for capturing the reference image (in which case $t_0=t_x$)

At a time $t_z$ the capturing of the plurality of images terminates. The triggering of the termination of the capture of the plurality of images may be in response to determining at least one of:
   deactivation of an image capture mode of a device;
   detection of powering up of a device; and
   receipt of a user input for capturing the reference image (in which case $t_x=t_z$)

In some examples, the duration of the capturing of the plurality of images is not predetermined or preset such that there is no overarching time limit for capturing the plurality of images. The capturing of the plurality of images may occur at least one of: before, after and during the capturing of the reference image. The reference image may correspond to one of the plurality of images.

The following scenario exemplifies a typical application of the example of the present disclosure. The example is embodied on a user's smart phone device which in addition to wireless communication, audio/visual playback and other functionalities also has image capturing capabilities. The user wishes to take a photo of a baby. The user initially holds his device such that its major plane is horizontal and activates an image capturing mode of the device. Responsive to this, the device automatically starts to capture a plurality of images 301 to 307. The first image 301 is captured with a device orientation parameter=horizontal. As the device was held relatively still when the first image was captured the movement parameter associated with the first image has a low value. The device was held by the user in such a way that the user's hand covered the lens so that a dark/substantially black image was captured. Accordingly, the pixel information parameter indicated a predominance of black pixels. Thus the first image 301 could be characterised with orientation, movement and pixel information parameters as [horizontal, still, black].

The user then moves the device to orientate it vertically to take aim at the baby. However, the second image 302 was captured during this movement such that the second image's movement parameter was high. The device orientation parameter of the second image was vertical. The second image captured an image of the baby, which was wearing a blue babygrow, such that the pixel information parameter indicated a predominance of blue pixels. Thus the second image 302 could be characterised as [vertical, moving, blue].

The third image 303 is captured whist the device remains steady and aimed at the baby and could be characterized as

[vertical, still, blue]. The user then operates the shutter button/function of the image capture mode to take a photo of the baby, thereby capturing the reference image 304. The reference image could be characterized as [vertical, still, blue].

The user maintains the position of the device, but the baby wanders off so that when the next image 305 is captured, the baby is no longer in the scene, instead only the white background is captured in the image. Thus the fifth image 305 could be characterised as [vertical, still, white]. Having taken his photo, the user then again moves the device to a horizontal orientation before deactivating the image capture mode. The sixth image 306 is captured during this movement such that it could be characterised as [horizontal, moving, white]. Finally, just before the user deactivates the image capturing mode a further image is captured when the device is horizontally aligned such that its lens is aimed at the user's brown shoes. The seventh image could therefore be characterised as [horizontal, still, brown]. Once the image capture mode has been deactivated, the capturing of a sequence of images terminates.

Each of the captured images parameters' is compared to the reference parameters [vertical, still, blue] and a selection of the captured imaged is based on the comparison. A selection of an image of the plurality of images is made by filtering the images based on the following parameters associated with each image:

- movement of the device upon image capture, i.e. a movement amount above a predetermined threshold being unacceptable orientation of the device upon image capture compared to the orientation of the device when capturing the reference image, i.e. the respective values of orientations must be sufficiently similar
- pixel information of the image compared to pixel information of the reference image, i.e. the respective pixel information values must be sufficiently similar.

The table below sets out the parameters associated with each of the plurality of captured images and the results of each filtering/selection process.

| Image | Movement filter | Orientation filter (Reference Orientation = Vertical) | Pixel information filter (Reference image pixels substantially blue) | Image selected |
|---|---|---|---|---|
| 301 | Within movement tolerance PASS | Horizontal FAIL | Pixels substantially black FAIL | NO |
| 302 | Exceed movement tolerance FAIL | Vertical PASS | Pixels substantially blue PASS | NO |
| 303 | Within movement tolerance PASS | Vertical PASS | Pixels substantially blue PASS | YES |
| 305 | Within movement tolerance PASS | Vertical PASS | Pixels substantially white FAIL | NO |
| 306 | Exceed movement tolerance FAIL | Horizontal FAIL | Pixels substantially white FAIL | NO |
| 307 | Within movement tolerance PASS | Horizontal FAIL | Pixels substantially brown FAIL | NO |

Following this comparison, only the third images 303, having parameters [vertical, still, blue] is selected. The non selected images are deleted and the selected image is stored in association with the reference image.

Advantageously, when a user takes his photo, additional images are also captured. However, the above-mentioned process filters out the irrelevant images (i.e. aimed in the wrong direction, having too much movement, or not capturing the same object/scene) such that a subset of only the most relevant images are selected, e.g. for presentation for a user. It might transpire that, in hindsight, in the photo the user took (the reference photo) the baby was not smiling or was out of focus. However, in the selected image 303, the baby was smiling/was in focus. Thus a user might wish to keep just the selected image 303. Advantageously, this example helps provide an improved method, apparatus and computer program for capturing an 'event'.

When a user uses an image playback application to view the photo he took, the reference image is displayed. The selected image could also be displayed, for example in response a user input gesture such as a shaking of the device.

FIG. 4 schematically illustrates another flow chart 400 of a further example of the present disclosure. In this example the capturing of the plurality of images of blocks 201a and 201b of FIG. 2 comprises capturing video 401. The plurality of captured images may be configured to define a video, e.g. capturing a plurality of frames of video, or a plurality of sections of video footage. In block 103 a reference image is captured.

In block 412 information relating to movement of an imaging device when capturing the video frames/sections of video is determined and associated with the video frames/sections of video. In block 422 an orientation of the imaging device, when capturing the video frames/sections of video, is determined and associated with the video frames/sections of video. In block 432 image analysis of the video frames/sections of video is performed to determine pixel information of the video frames/sections of video. The determined pixel information is associated with the video frames/sections of video.

In blocks 214, 224 and 234, equivalent processes to those of blocks 412, 422 and 432 are performed with respect to the reference image.

In block 405, a determination is made to select one or more the video frames/portions of video based on at least one of:
- movement information
- orientation information
- pixel information Following the determination of which video frames/sections of video to select of block 405, the selected video frames/selected portions of video may be, at least one of:
- outputted, as indicated in block 406a,
- associated with the reference image, as indicated in block 406b,
- displayed, as indicated in block 406c, and
- stored, as indicated in block 406d.

The unselected video frames/sections of video may be caused to be, at least one of:
- hidden/precluded from display, as indicated in block 407a, and
- deleted, i.e. cut/edit the video to remove unselected portions, as indicated in block 407b.

The flowchart of FIG. 4 represents one possible scenario among others. The order of the blocks shown is not absolutely required, so in principle, the various blocks can be performed out of order. Not all the blocks are essential. In certain embodiments one or more steps may be performed in a different order or overlapping in time, in series or in parallel one or more steps may be omitted or added or changed in some combination of ways. In particular, the selection of a video portion based on a parameter may be performed after each parameter has been determined and associated with its respective video portion.

FIG. 5 illustrates a time line 500 of the operation of the example of FIG. 4. At a time to, the plurality video frames/sections of video 501-507 start to be captured, i.e. the video starts to be recorded. This could be responsive to the activation of an image capturing mode. At a time $t_x$, the user actuates an image capture function, i.e. takes a photo in a conventional manner, causing the capturing of the reference image 304. At a time $t_z$, the plurality of video frames/sections of video stop being captured, i.e. the video recording ceases, e.g. responsive to deactivation of the image capturing mode.

Parameters, as discussed above, associated with each video frame/sections of video are determined and compared against reference parameters of a captured reference image 304.

Considering a scenario similar to that discussed above with respect to capturing the event of taking a photo of a baby, in this video based example, instead of a selection of images relevant to the reference image, a selection of video frames/sections of video portions relevant to the reference image are provided. In this way, a user of provided with video of what occurred before and/or after the photo was taken but only relevant frames of the video are selected.

When a user uses an image playback application to view the photo he took, the reference image 304 is displayed. The selected video portion 508, i.e. frames/sections of video 503 and 504, could also be played, for example in response a user input gesture such as a shaking of the device, thereby displaying video footage of what occurred before and/or after the (reference) photo was taken. The reference photo could morph into the first frame of the video portion and after play back of the video portion(s) the final video frame could morph back to the reference photo. Advantageously, in this example when a user takes a photo, video footage is also additionally captured. However, the above-mentioned process filters out the irrelevant sections of video (i.e. where the device is aimed in the wrong direction relative to the direction of the reference image/target, video portions having too much movement, or not capturing the same object/scene as the reference image) such that a subset of only the most relevant video portions are selected, e.g. for presentation for a user. Advantageously, this example help ensure that the video frames/portions match and/or relate to the reference image.

The blocks illustrated in above mentioned flowcharts of the figures may represent steps in a method and/or sections of code in the computer program.

The illustration of a particular order to the blocks does not necessarily imply that there is a required or preferred order for the blocks and the order and arrangement of the block may be varied. Furthermore, it may be possible for some steps to be omitted.

It will be understood that each block and combinations of blocks, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory storage device and performed by a processor. As will be appreciated, any such computer program instructions may be loaded onto a computer or other programmable apparatus (i.e., hardware) to produce a machine, such that the instructions which are performed on the programmable apparatus create means for implementing the functions specified in the blocks. These computer program instructions may also be stored in a computer-readable medium that can direct a programmable apparatus to function in a particular manner, such that the instructions stored in the computer-readable memory produce an article of manufacture including instruction means which implement the function specified in the blocks. The computer program instructions may also be loaded onto a programmable apparatus to cause a series of operational steps to be performed on the programmable apparatus to produce a computer-implemented process such that the instructions which are performed on the programmable apparatus provide steps for implementing the functions specified in the blocks.

FIG. 6 schematically illustrates an apparatus 600 suitable for use with examples of the present disclosure. FIG. 6 focuses on the functional components necessary for describing the operation of the apparatus. The component blocks of FIG. 6 are functional and the functions described may or may not be performed by a single physical entity.

The apparatus 600 comprises a controller 601. Implementation of the controller can be in hardware alone (a circuit, a processor . . . ), have certain aspects in software including firmware alone or can be a combination of hardware and software (including firmware).

The controller may be implemented using instructions that enable hardware functionality, for example, by using executable computer program instructions in a general-purpose or special-purpose processor that may be stored on a computer readable storage medium (disk, memory etc) to be executed by such a processor.

In the illustrated example, the controller is provided by a processor 602 and memory 603. Although a single processor and a single memory are illustrated in other implementations there may be multiple processors and/or multiple memories.

The processor 601 is configured to read from and write to the memory 603. The processor may also comprise an input interface 604 via which data (such as captured images, reference images and associated parameters) and/or commands are input to the processor and an output interface 605 via which data (such selected captured images) and/or commands are output by the processor.

The memory 603 stores a computer program 606 comprising computer program instructions 607. The instructions control the operation of the apparatus 600 when loaded into the processor 601. The computer program instructions 607 provide the logic and routines that enables the apparatus 600 to perform the methods and algorithms described above and shown in the flowcharts of the figures. The memory 603 may also store the selected images. Alternatively, the selected images may be output for storage in another memory internal or external of the apparatus (not shown). The processor by reading the memory is able to load and execute the computer program.

The computer program may arrive at the apparatus 600 via any suitable delivery mechanism. The delivery mechanism may be, for example, a computer-readable storage medium 612, a computer program product, a memory device, a record medium, an article of manufacture that tangibly embodies the computer program 606 and the computer instructions 607. The delivery mechanism may be a signal configured to reliably transfer the computer program.

Although the memory 603 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The apparatus may comprise hardware or means configured to capture images 608, such as a CCD sensor array. The apparatus may also comprise one or more sensors such as a sensor to detect movement of the apparatus 609, i.e. an accelerometer, and a sensor to detect an orientation of the apparatus 610, e.g. gyroscopes or magnetic compass. The apparatus may also comprise an output device 611 such as a display to display the selected images.

Although the apparatus has been described above in terms of comprising various components, it should be understood that the components may be embodied as or otherwise controlled by a corresponding processing element or processor of the apparatus. In this regard, each of the components described above may be one of more of any device, means or circuitry embodied in hardware, software or a combination of hardware and software that is configured to perform the corresponding functions of the respective components.

The apparatus may be for capturing images, for example, a dedicated image capturing device such as a standalone camera, or it may be a multi-functioning electronic device, a mobile cellular telephone, a wireless communications device, a hand-portable electronic device etc or a module or chipset for use in any of the foregoing.

In one example, the apparatus 600 is embodied in a hand held portable electronic device, such as a mobile telephone or personal digital assistant, that may additionally provide one or more audio/text/video communication functions (e.g. telecommunication, video-communication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions (e.g. Moving Picture Experts Group-1 Audio Layer 3 (MP3) or other format and/or (frequency modulation/amplitude modulation) radio broadcast recording/playing), downloading/sending of data functions, image capture function (e.g. using a (e.g. in-built) digital camera), and gaming functions.

As used in this application, the term 'circuitry' refers to all of the following:
(a) hardware-only circuit implementations (such as implementations in only analogue and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device."

In the description, the wording 'connect', 'couple' and 'communication' and their derivatives mean operationally connected/coupled/in communication. It should be appreciated that any number or combination of intervening components can exist (including no intervening components).

Examples of the present invention provide both a method and corresponding apparatus consisting of various modules or means that provide the functionality for performing the steps of the method of the flow charts. The modules or means may be implemented as hardware, or may be implemented as software or firmware to be performed by a computer processor. In particular, in the case of firmware or software, examples of the invention can be provided as a computer program product including a computer readable storage structure embodying computer program code (i.e. the software or firmware) thereon for performing by the computer processor.

The apparatus may be provided in a module. As used here 'module' refers to a unit or apparatus that excludes certain parts/components that would be added by an end manufacturer or a user.

Features described in the preceding description may be used in combinations other than the combinations explicitly described. Although functions have been described with reference to certain features, those functions may be performable by other features whether described or not. Although features have been described with reference to certain examples, those features may also be present in other examples whether described or not. Although various examples of the present disclosure have been described in the preceding paragraphs, it should be appreciated that modifications to the examples given can be made without departing from the scope of the invention as claimed.

The term 'comprise' is used in this document with an inclusive not an exclusive meaning. That is any reference to X comprising Y indicates that X may comprise only one X or may comprise more than one X. If it is intended to use 'comprise' with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A computer implemented method comprising causing, at least in part, actions that result in, at a device:
   commencing automated capturing of a video;
   associating the automatically captured video with at least one parameter;
   capturing a reference image in response to receiving a specific user input to capture the reference image;
   associating the captured reference image with at least one reference parameter;
   determining to select the automatically captured video based on a comparison of its associated at least one parameter against the at least one reference parameter; and
   wherein the at least one parameter and the at least one reference parameter relate to at least one of:
      movement of the device determined via at least one movement sensor, and
      an orientation of the device determined via at least one orientation sensor.

2. A computer implemented method as claimed in claim 1, further comprising:
   associating the automatically captured video with at least one further parameter;
   associating the captured reference image with at least one further reference parameter, and
   wherein the at least one further parameter and the at least one further reference parameter relate to
   an intrinsic property of the automatically captured video and the captured reference image respectively.

3. A computer implemented method as claimed in claim 1, wherein the video and reference image are captured by the device and the at least one parameter and at least one reference parameter relate to at least one of:
   an orientation of the device at a time of capturing the automatically captured video and the at least one reference image respectively; and
   movement of the device at a time of capturing the automatically captured video and the at least one reference image respectively.

4. A computer implemented method as claimed in claim 1, further comprising:
   determining the at least one parameter and the at least one reference parameter based on information relating to an orientation of the device when capturing the automatically captured video and the reference image respectively.

5. A computer implemented method as claimed in claim 1, further comprising:
   determining information relating to movement of the device;
   associating movement information of the device with automatically captured video; and
   determining to select the automatically captured video based on the movement information associated the automatically captured video.

6. A computer implemented method as claimed in claim 2, wherein the at least one further parameter and the further reference parameter relate to pixel information of the automatically captured video and captured reference image respectively.

7. A computer implemented method as claimed in claim 2, further comprising:
   determining the at least one further parameter and the further reference parameter based on image analysis of the automatically captured video and the captured reference image respectively.

8. A computer implemented method as claimed in claim 1, further comprising at least one of:
   outputting the selected automatically captured video;
   associating the selected automatically captured video with the captured reference image,
   displaying the selected automatically captured video and the captured reference image;
   storing the selected automatically captured video;
   precluding a display of unselected automatically captured video; and
   deleting unselected automatically captured video.

9. A computer implemented method as claimed in claim 1, further comprising commencing the automated capturing of the video in response to determining at least one of:
   activation of an image capture mode of a device;
   detection of powering up of a device; and
   receipt of the specific user input for capturing the reference image.

10. A computer implemented method as claimed in claim 1, further comprising terminating the automated capturing of video in response to determining at least one of:
   deactivation of an image capture mode of a device;
   detection of powering down of a device; and
   receipt of the specific user input for capturing the reference image.

11. A computer implemented method as claimed in claim 1, wherein the automated capturing of the video occurs at least before the capturing of the reference image.

12. A computer implemented method as claimed in claim 1, wherein determining to select the automatically captured video comprises determining to select one or more portions of the video.

13. A computer implemented method as claimed claim 12, further comprising at least one of:
   outputting one or more selected portions of video;
   associating one or more selected portions of video with the captured reference image,
   displaying one or more selected portions of video and the captured reference image;
   storing one or more selected portions of video;
   precluding a display of unselected portions of video; and
   deleting unselected portions of video.

14. An apparatus comprising:
   at least one processor; and
   at least one memory including computer program code;
   the at least one memory and the computer program code configured to, with the at least one processor, cause the apparatus at least to perform:
   commencing automated capturing of a video;
   associating the automatically captured video with at least one parameter;
   capturing a reference image in response to receiving a specific user input to capture the reference image;

associating the captured reference image with at least one reference parameter;

determining to select the automatically captured video based on a comparison of its respective associated at least one parameter against the at least one reference parameter; and wherein the at least one parameter and the at least one reference parameter relate to at least one of:
- movement of the device determined via at least one movement sensor, and
- an orientation of the device determined via at least one orientation sensor.

15. An apparatus as claimed in claim 14, wherein the at least one memory and the computer program code are configured to, with the at least one processor, cause the apparatus at least to perform:

associating the automatically captured video with at least one further parameter;

associating the captured reference image with at least one further reference parameter; and wherein the at least one further parameter and the at least one further reference parameter relate to an intrinsic property of the automatically captured video and the captured reference image respectively.

16. An apparatus comprising means configured to perform, at least, the method as claimed in claim 1.

17. A device comprising the apparatus of claim 14, wherein the device is configured for at least one of: wireless communication, mobile telephony and portable handheld use.

18. A non-transitory computer readable medium encoded with instructions that, when performed by at least one processor, causes at least the following to be performed:

commencing automated capturing of a video;

associating the automatically captured video with at least one parameter;

capturing a reference image in response to receiving a specific user input to capture the reference image;

associating the captured reference image with at least one reference parameter;

determining to select the automatically captured video based on a comparison of its respective associated at least one parameter against the at least one reference parameter; and wherein the at least one parameter and the at least one reference parameter relate to at least one of:
- movement of the device determined via at least one movement sensor, and
- an orientation of the device determined via at least one orientation sensor.

* * * * *